Dec. 7, 1926.

L. J. SHIELDS 1,609,579

CUT-OFF MACHINE

Filed Feb. 15, 1924

Inventor
Lytton J. Shields.
Attorneys

Dec. 7, 1926.　　　　　　　　　　　　　　　　　　1,609,579
L. J. SHIELDS
CUT-OFF MACHINE
Filed Feb. 15, 1924　　　　　4 Sheets-Sheet 2

Inventor
Lytton J. Shields
Fischer Lagaard
Attorneys

Dec. 7, 1926.

L. J. SHIELDS 1,609,579

CUT-OFF MACHINE

Filed Feb. 15, 1924    4 Sheets-Sheet 3

Inventor
Lytton J. Shields.
By Fischer Lagaard.
Attorneys

Dec. 7, 1926.

L. J. SHIELDS 1,609,579

CUT-OFF MACHINE

Filed Feb. 15, 1924   4 Sheets-Sheet 4

Inventor

Lytton J. Shields

By Fischer Lagaard
Attorneys

Patented Dec. 7, 1926.

1,609,579

UNITED STATES PATENT OFFICE.

LYTTON J. SHIELDS, OF ST. PAUL, MINNESOTA.

CUT-OFF MACHINE.

Application filed February 15, 1924. Serial No. 693,036.

My invention relates to cutoff machines and has for its object to provide a device which may operate in conjunction with moving stock to cut off uniform lengths therefrom.

Another object of the invention resides in providing a device whereby sections of the stock are periodically cut off into equal lengths as the stock travels through the machine.

A feature of the invention resides in providing a support that may be attached to any machine, which support carries a carriage having a cutoff mechanism mounted thereon which automatically is arranged to cut off the stock and which is actuated by the engagement of the stock with control mechanism connected with the cutoff device proper.

A further feature of the invention resides in providing means for permitting the carriage to travel along with the stock upon the support while the stock is moving and the cutting operation is taking place, so that the movement of the stock is not arrested.

Another object of the invention resides in providing the carriage having a cutoff mechanism and a continuously operating motor mounted thereon together with means for momentarily connecting said cutoff mechanism with the motor to operate the same.

Another feature of the invention resides in providing means for discharging the sections of stock severed from the machine proper.

A still further object of the invention resides in providing means for quickly and effectively returning the carriage and mechanisms mounted thereon to normal position, which means includes a device for preventing shocks together with a structure for preventing rebounding and a device adapted to exert a pressure upon the carriage to return the same which becomes inoperative after the return of the carriage.

Other features of the invention reside in the detailed construction of the device as is clearly brought out in the following specification and claims:

In the drawings illustrating the invention in one form,

Figure 8 is a perspective view of one of the wood separators as it would appear when cut by my device from a long strip of material.

Figure 1:
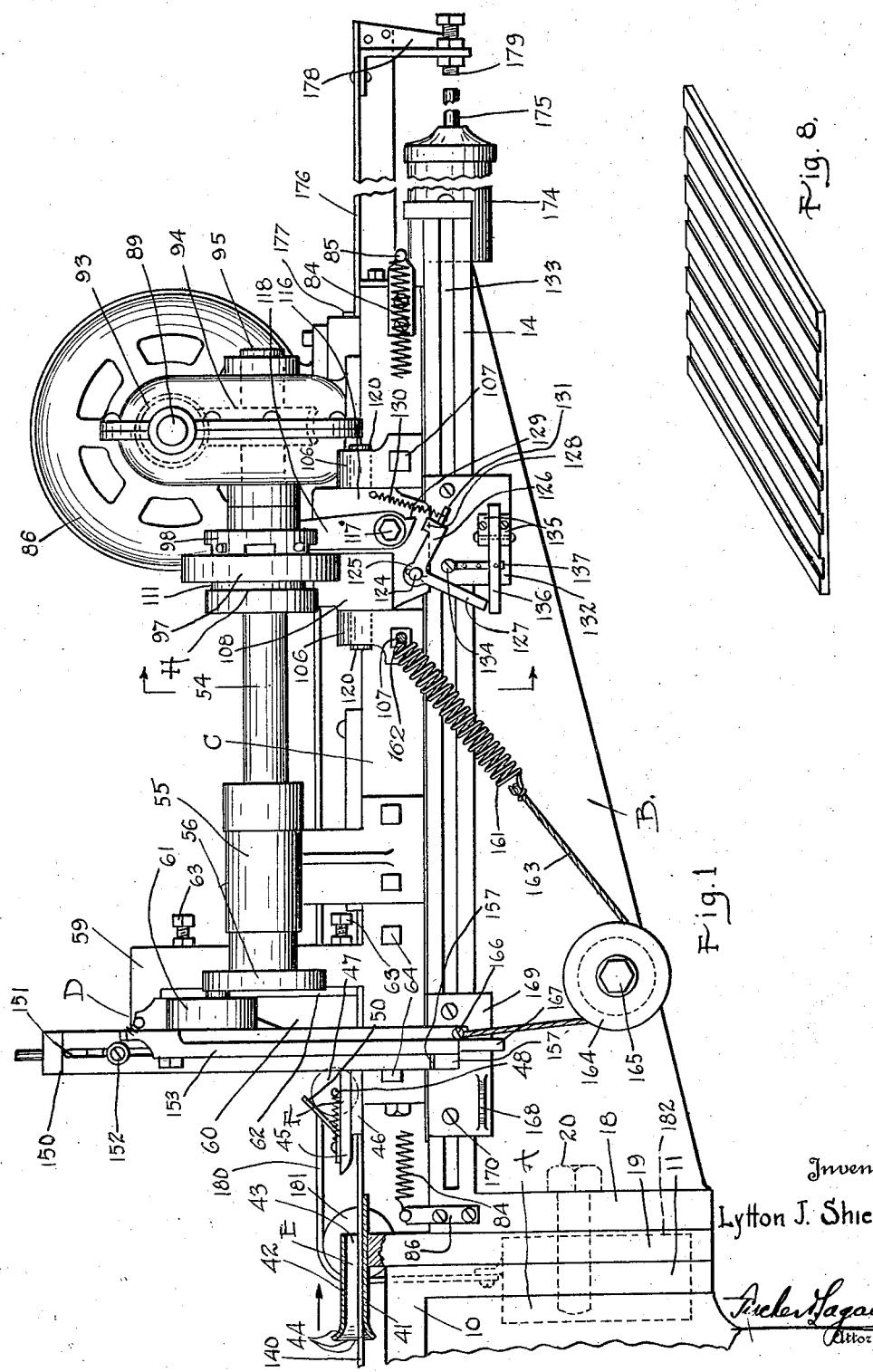
Figure 1 is a side elevational view of my invention.

My invention may be used for a number of purposes, such as cutting off sections of rubber, metal, fiber, paper or other materials, and is particularly desirable in use in the construction of wood separators for storage batteries. These separators are preferably formed in long sheets by running the same through a sticker or suitable moulding machine to give the formation desired. In the drawings I have illustrated a portion of a sticker indicated at A, consisting of a table 10 and a leg or upright connected therewith. This device has not been illustrated in detail as such machines are now well known in the art and form no particular feature of the invention. The stock 140 in leaving the sticker A passes in the direction indicated by the arrow in Figure 1 above the table 10.

My invention proper consists primarily of a base B attached to the sticker A which has a carriage C mounted thereon adapted to be engaged by the stock as the same leaves the sticker A. When the said carriage is moved the required distance a cutoff mechanism indicated in its entirety at D serves to cut off a section of the stock and discharge the same and to permit the carriage to reassume its normal position.

The base B consists primarily of two rails 13 and 14 which are connected together at the two ends by cross members 15. These rails have formed integral with them webs 16 and 17 which are all connected to a bracket 18 formed at the enlarged ends of said webs as clearly shown in Figure 1. The entire structure together with a plate 19 is bolted to the portion 11 of sticker A by means of bolts 20 so that said rails 13 and 14 extend outwardly from the sticker proper with their surfaces below the level of the table 10 so that the stock in leaving the sticker passes above and along the same.

The carriage C consists of a frame positioned over and above the base B which frame comprises two rails 21 and 22 corresponding to the rails 13 and 14 of the base B. These rails are connected together at one end by a bar 23 and at their other ends by a plate 24 all of which are formed integral. Along the undersides of the rails 21 and 22 and upon the upper surfaces of the rails 13 and 14 are formed oppositely facing V-shaped grooves 25 and 26 in which are positioned a number of balls 27 for mounting the carriage C to permit the same to travel along the base B. The various balls 27 are held properly spaced by a ball retainer 28 positioned between the two rails which is of ordinary construction. With this arrangement the carriage C may move longitudinally of the support or base B toward or away from the sticker A in a manner to be presently described.

Figure 2:
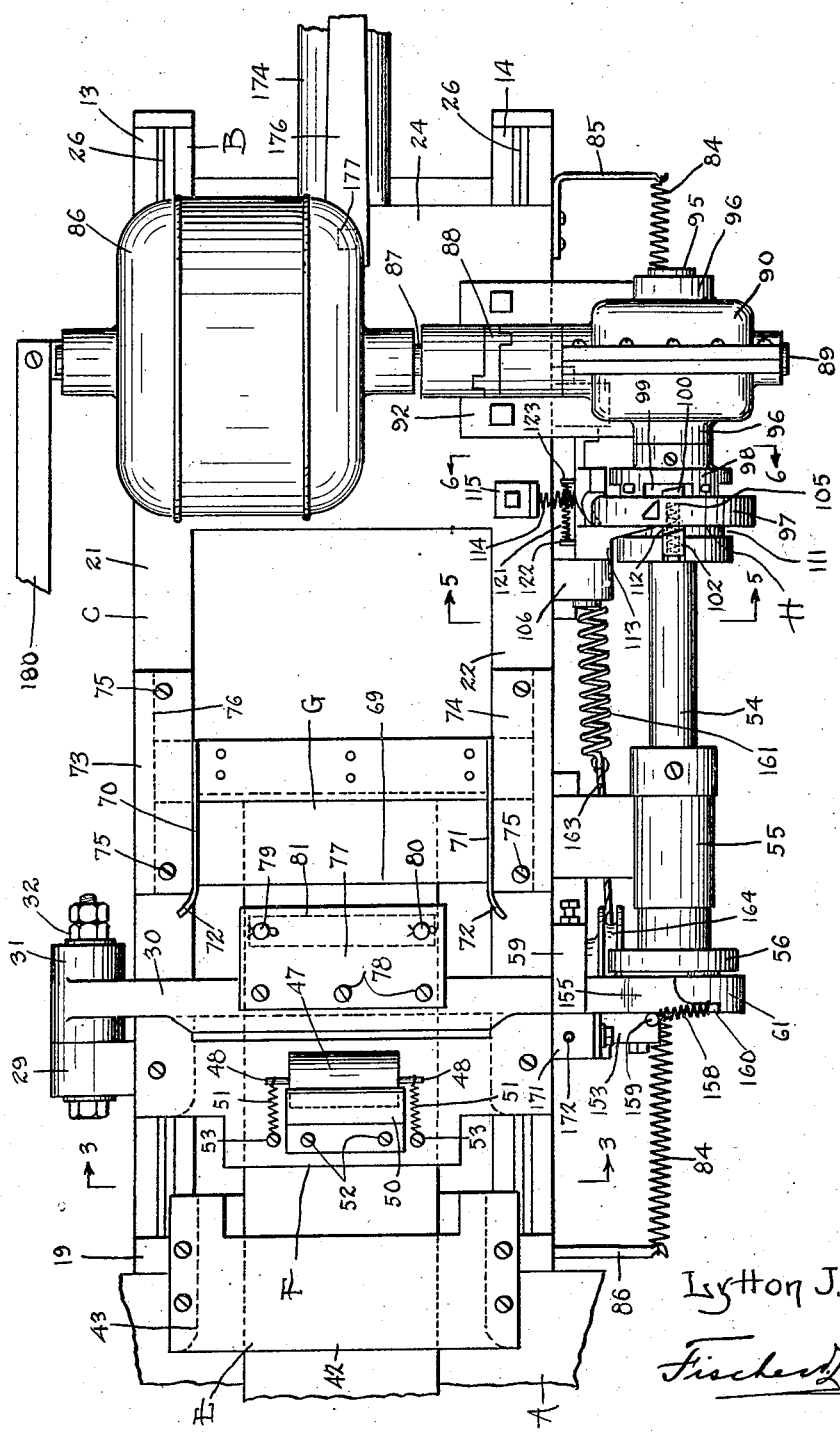
Figure 2 is a plan view of the structure shown in Figure 1.
Figure 3:
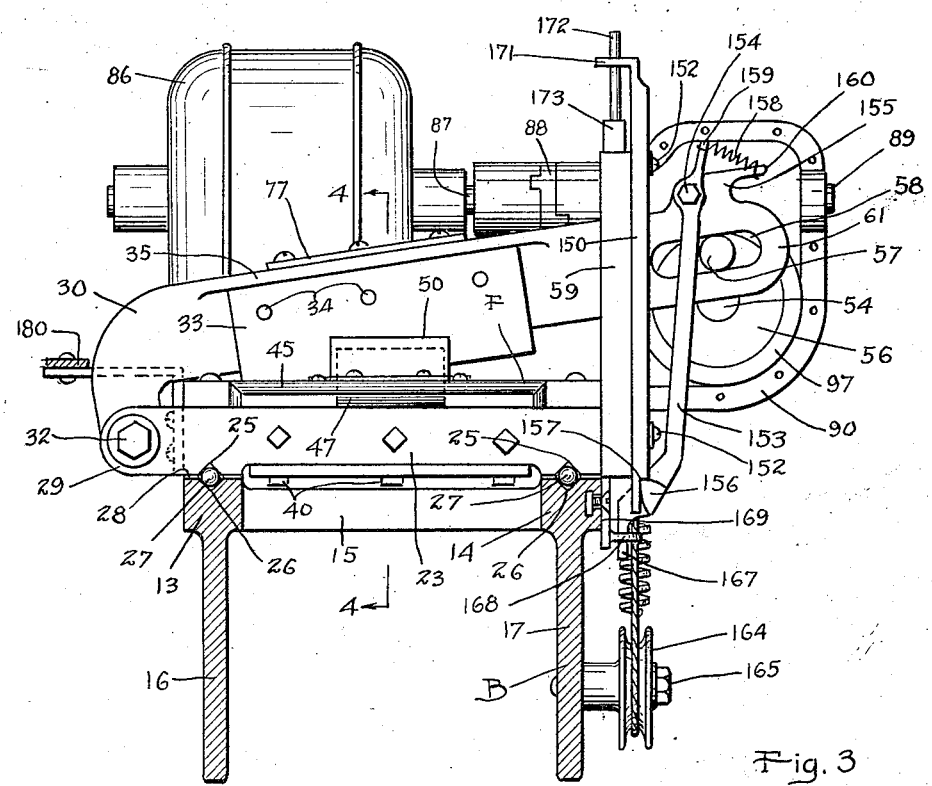
Figure 3 is a sectional view taken on line 3—3 of Figure 2.
Figure 4:
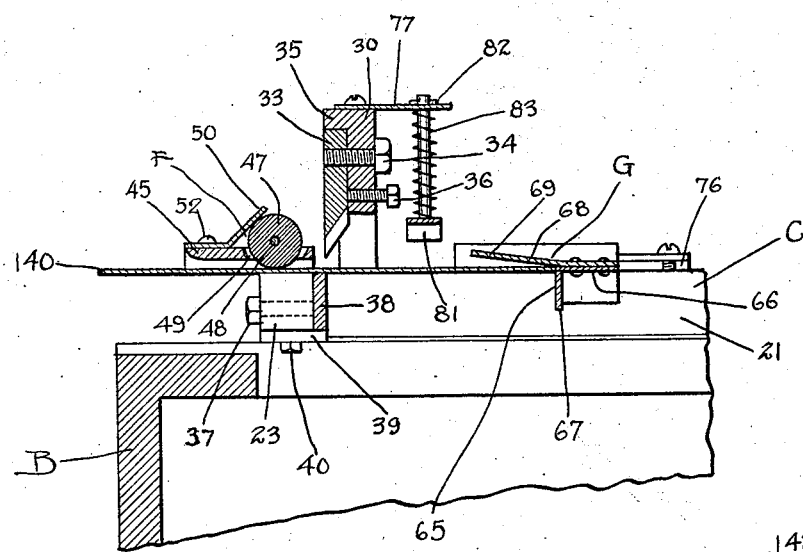
Figure 4 is a sectional view of a portion of the cutoff device taken on line 4—4 of Figure 3.

Upon the forward end of the carriage C is mounted the cutter D which is best shown in Figures 2, 3 and 4 as illustrated. Upon the exterior surface of rail 21 is formed a projection 29 which extends outwardly beyond the same. An arm 30 which carries the cutting member of the device extends completely across the carriage C and is formed with a boss 31 by means of which the same is pivoted to the projection 29 by means of a bolt 32 passing therethrough. To the arm 30 is attached a tool steel cutting knife 33 which is rigidly bolted to the face of said arm 30 by means of bolts 34 screwed into the same. This cutter rests against a shoulder 35 formed along the upper edge of arm 30 by means of which pressure may be transmitted from said arm to the cutter in the operation of the device. For adjusting the cutting knife 33 a number of set screws 36 are employed which are screwed into the arm 30 immediately below the screws 34. By first setting the screws 36 in the proper position and then tightening upon the screws 34 the knife 33 may be adjusted so that the same comes in proper engagement with the complemental cutting member of the cutter. The complemental cutter cooperating with the knife 33 consists of a shear member or knife 38 which is rigidly secured to the portion 23 of the carriage C by means of bolts 37. This cutter rests upon a plate 39 positioned upon the lower side of the frame member 23 and secured thereto by screws or bolts 40. As the cutting takes place the pressure exerted upon the cutting member 38 is transmitted through the bolts 37 and through the plate 39 to the carriage C. As before stated, the knife 33 in conjunction with the cutter 38 forms a shear which is adapted to shear or cut off sections of the stock as the same is passed through the machine.

The structure for feeding the stock into the machine consists of two guides illustrated at E and F. The device illustrated at E is attached to the plate 19 and consists of two horizontal plates 41 and 42 secured together at their ends by means of separators 43, all of which are arranged with curved edges 44 by means of which the stock may be readily directed into said guides as the same approaches the cutoff mechanism.

The guide F is positioned upon the forward end of the carriage C and is attached to the member 23 thereof. This guide consists of a plate 45 which has secured to its ends two separators 46 which in turn are attached to the upper surface of the member 23, which in this instance forms the other portion of the guide. The stock in leaving the guides E is immediately directed into the guide F where the same is led to the cutoff device D previously referred to. As will be noted, the stock passes over the upper surface of the member 23 and over the upper edge of the cutter 38 where, when a certain length of stock has passed, it becomes severed by the knife 33 in a manner to be presently described.

For preventing the stock from backing or reversing I provide a device illustrated in Figure 4. This device consists of a roller 47 having trunnions 48 formed at the extreme ends of the same. This roller passes through an opening 49 in the plate 45 and engages against the upper surface of the stock or member 23 of carriage C. In its engaging position the roller 47 is of such a size that the trunnions 48 project above the surface of the plate 45. Immediately back of the roller 47 is arranged a bent plate 50 against which the roller 47 may extend. This plate is secured to plate 45 by means of screws 52 as clearly shown in Figure 2. Two springs pivotally attached, at one end to the trunnions 48 and at their other ends to two screws 53 secured to the plate 45, serve to hold the roller 47 at all times in contact with the bent plate 50. When the stock 140 is fed through the device in the direction indicated by the arrow in Figure 4 the roller 47 is forced away from the surface of the member 23 and the plate 50 and rotates freely, permitting the stock to readily travel through the machine. When, on the other hand, the travel of the stock reverses in directions, the roller 47 immediately becomes wedged between the plate 50 and the member 23 securely clamping the stock against the same member 23 and preventing the travel of the stock in the wrong direction.

For operating the cutter D a structure is provided which is operated by a shaft 54 journalled in a bearing 55, attached to the rail 22 of carriage C. This shaft extends outwardly beyond the said carriage and above the same in the vicinity of the protruding ends 61 of the arm 30. Upon the extreme end of this shaft is mounted a flanged plate 56 which has eccentrically positioned upon it a crank arm 57. This crank arm is adapted to operate within a slot 58 formed along the extreme end 61 of the arm 30 which serves as a guideway for directing the movement of the same. It can readily be seen that as the shaft 54 is rotated the crank 57 causes the forward portion 61 of the arm 30 to be raised up and down and to be oscillated about its pivot point on the bolt 32 so that the knife 33 may cooperate with the cutting member 38 to sever the sections of stock as the same is required. To rigidly guide the movement of the forward end 61 of the arm 30 a vertical guideway 59 is employed which is rigidly bolted to the rail 22 of carriage C by means of bolts 64. This guideway is formed with a vertical slot 60 through which the forward portion 61 of arm 30 extends. A bearing 62 is positioned along the interior of slot 60 and bears against the side of the arm 30 so as to hold the knife 33 in cutting contact with the cutting member 38 throughout the entire movement of the cutter D. This bearing may be adjusted by means of adjusting screws 63 illustrated in Figure 1. With the construction shown it can readily be seen that as the stock is fed through the guides E and F and beneath the knife 33 that the same may be readily cut off when the shaft 54 is operated.

In order to regulate the length of the sections of stock severed from the main piece of stock a stop G is employed which is best illustrated in Figures 2 and 4. This stop G comprises an angle 65 having a horizontal leg 66 and a depending leg 67. To the upper portion of this angle is secured a plate 68 which is bent upwardly at 69 to guide the stock as the same passes beneath the knife 33 against the depending leg 67 of said angle. Along the ends of the plate 68 are provided guide members 70 and 71 which have their ends curved outwardly as indicated at 72 similar to the members 43 of the guide E. As will be noted in the figure the upper leg 66 of angle 65 projects outwardly beyond the guide members 70 and 71 which are of a width equal to the distance between the rails 21 and 22 of carriage C. As will be noted, said leg overlaps upon said rails 21 and 22 and may be securely held in place upon said rails by means of two clamps 73 and 74 secured to said rails by means of screws 75, which clamps are formed with rabbeted recesses 76 in which the protruding ends of leg 66 of angle 65 may project. With this construction the stock travels along until it hits the stop so formed, whereupon the entire carriage C is moved along with the stock through the engagement of the same with said stock, which continues until the stock is cut off by the knife 33 and discharged from the machine.

For discharging the severed sections of the stock a plate 77 is employed which is secured to the top of the arm 30 by means of screws 78. This plate protrudes outwardly beyond arm 30 and has attached to it two depending plungers 79 and 80 which have secured to their lower ends a shoe 81. The plungers 79 and 80 are slidably mounted on the plate 77 and are held in place by means of cotter pins 82 passing through the extreme ends of the same. These plungers have positioned upon them coil springs 83 which are seated at one end against the shoe 81 and at their other ends against the underside of the plate 77 normally holding the shoe 81 in its lowermost position. As the cutter is operated and the end of the stock severed from the length of the stock the shoe 81 presses upon the section severed forcing it downwardly between the side of the cutting member 38 and the leg 66 of stop G, until the same drops from between these two members and through the openings in the carriage C and the base B, where the severed sections forming the finished product may be directed to some suitable receiver not illustrated in the drawings. A tension coil spring 84 is hooked at one end upon an arm 85 secured to the extreme end of carriage C and at its other end upon a similar arm 86 secured to the opposite end of the base B. This coil spring causes the carriage to be normally held toward the machine from which the stock is fed. As the stock engages the stop G the stock causes the entire carriage C and the cutter D mounted thereon to move along with the stock while the cutting operation is being performed upon the same as previously described.

The operation of the shaft 54 is secured by means of an electric motor 86 which is mounted upon the plate 24. This motor has a shaft 87 which protrudes outwardly beyond the same and which is connected by means of a universal joint 88 with a shaft 89 substantially in alinement therewith, which shaft is journalled in a housing 90 rigidly bolted to plate 24 by means of bolts 91 which pass through a base 92 formed on said housing. Within the housing 90 and upon the shaft 89 is mounted a worm gear 93 which meshes with a worm wheel 94 also positioned within the housing 90 and rigidly keyed to a shaft 95 journalled in bearings 96 formed on said housing. This shaft, as will be noted in Figure 2, extends in alinement with the shaft 54 and may be coupled therewith by means of a clutch mechanism, indicated in its entirety at H.

Figure 5:
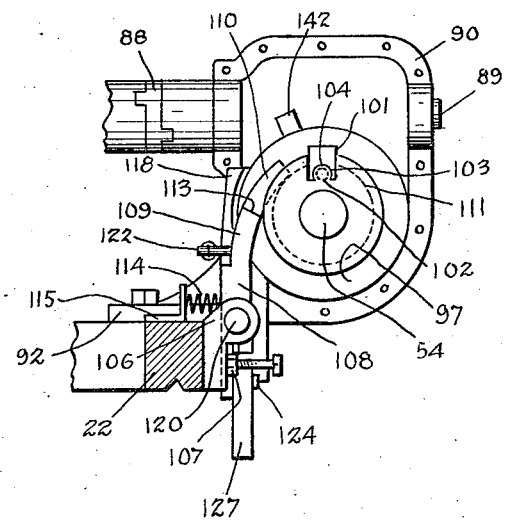
Figure 5 is a sectional, detailed view of the clutch and trip mechanism taken on line 5—5 of Figure 2.

The clutch mechanism H consists of a flanged member 97 which is rigidly secured to the end of shaft 54 and a similar flanged member 98 secured to the end of the shaft 95 which flanged members face each other as clearly shown in Figure 2. The flanged member 98 is formed with notches 99 along the surface thereof which notches are adapted to be engaged by a dog 100 slidably positioned in a slot 101 formed on the flanged member 97 which is best shown in Figure 5. When the dog 100 is drawn back so that the protruding end of the same lies flush with the face of the flanged member 97 the clutch H is rendered inoperative and the shaft 54 stops. On the other hand, when the dog 100 is projected outwardly beyond the face of the flange 97 the same is adapted to engage into any of the notches 99 and to cause the shaft 54 to travel along the shaft 95, which in the operation of the machine is at all times rotating, due to the continuous operation of the motor 86. A coil spring 102, shown in dotted lines in Figure 5, positioned within a groove 103 formed in the dog 100, seated at one end against a leg 104, formed on the flange 97 and at its other end against a shoulder 105, formed on said dog, tends to normally hold the dog 100 outwardly beyond the face of the flanged member 97 so that the clutch mechanism normally remains in driving position and only becomes released by a mechanism to be presently explained when the cutting operation performed upon the stock has been completed.

Figure 7:
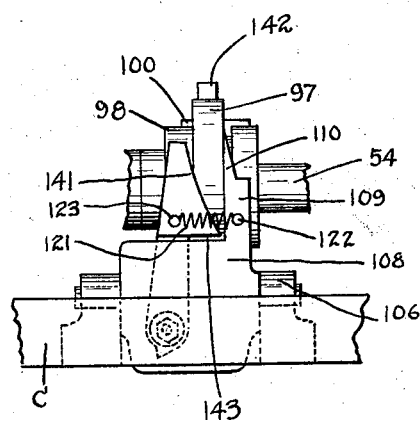
Figure 7 is a view taken on line 7—7 of Figure 6.

In order to release the clutch H when the cutting operation is completed and the cutting arm 30 has been raised the maximum amount, I employ a structure best illustrated in Figures 1, 5 and 7. Two bearings 106 are rigidly bolted to the side of the rail 22 of carriage C by means of bolts 107. In these bearings is pivotally mounted a plate 108 which has trunnions 109 formed on the ends of the same which are directly journalled in the bearings 106. This plate, as will be noted in Figure 5, is positioned between the rail 22 and the shaft 54 and upon oscillation is adapted to move toward or away from the clutch mechanism H. Upon the upper portion of the plate 108 is formed an arm 109 which has a pointed finger 110 bent toward the flanged member 97. This finger 110 rides in a groove 111 formed in the flanged member 97 and is adapted to engage into a wedge shaped recess 112 formed in the dog 100 as clearly shown in Figure 2. As the shaft 95 rotates the dog 100 being in engagement with the notch 99 of the flanged member 98 causes the flanged member 97 to rotate with said shaft. When the plate 108 and arm 109 formed thereon are in the position shown in Figure 5 finger 110 is so positioned that the same extends down into the groove 111, so that the same may engage within the recess 112 which in conjunction therewith has a wedge action which withdraws the dog 100 from engagement with the slot 99. As will be noted in Figure 2 the arm 109 is formed with a shoulder 113 which directly engages against the side of the dog 100 and positively terminates the movement of the shaft 54 at a desired time, which is so arranged that the cutter arm 30 is in its uppermost position as shown in Figure 3. In this manner the position of the cutting knife 33 when the movement of the same terminates is definite and determined. Due to the fact that as long as the arm 109 is positioned as shown in Figure 5, it is impossible for the shaft 54 to travel further. A compression coil spring 114 is seated at one end against a bracket 115 secured to plate 24 and at its other end to the side of the plate 108, thereby normally holding the arm 109 as shown in Figure 5 with the finger 110 riding along the groove 111.

Figure 6:
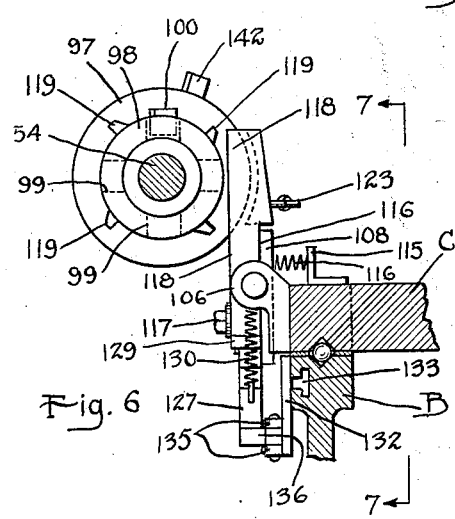
Figure 6 is a view similar to Figure 5 of the resetting mechanism taken on line 6—6 of Figure 2.

The plate 108 is recessed over a portion of the surface of the same as indicated at 116. At the lower portion of the recessed part 116 below the trunnions 120 is pivotally mounted by means of a bolt 117 an upwardly extending arm 118 which is adapted to extend when the parts are arranged as shown in Figure 5 behind the flanged member 98 and in close proximity thereto. The relation of the arm 118 is clearly illustrated in Figure 6. Upon the periphery of the flanged member 98 is formed a number of cam lugs 119 which, when arm 118 is positioned as shown in Figure 1, are adapted to engage the surface of said arm and to force the same away from the shaft 54. This causes the plate 108 to swing upon its trunnions 120 which in turn causes the finger 110 of arm 109 to move together with the plate and to be dislodged from the groove 111 and the engagement of recess 112, thereby releasing the dog 100, which immediately on account of the spring 102, comes into engagement with one of the notches 99 in the flanged member 98, thereby causing the shaft 54 to be rotated by means of the shaft 95 and the motor 86. This action continues until the plate 108 is again allowed to resume its normal position, resetting the finger 110 into the groove 111. A tension coil spring 121 attached at one end to a pin 122 secured to arm 109 and at its other end to a pin 123 secured to arm 118, normally causes the arm 118 to assume the position shown in Figure 1 in which the surface of said arm lies in the path of movement of the cam lug 119.

In the inoperative position of the device the arm 118 is held so that the same is swung away from the path of travel of the cam lugs 119, thereby permitting the finger 110 to ride in the groove 111 and to hold the dog 100 from disengagement of the notches 99 of the flanged member 98. This is accomplished as follows: Upon the lower portion of the plate 108 is pivoted at 124 a trip 125 having a horizontal lever 126 and a depending finger 127. This lever 126 is formed with a catch 128 which is adapted to engage a similar catch 129 formed upon the lower end of the arm 118. A coil spring 130 secured to a pin 131 formed on the end of the lever 128 and to the plate 108 serves to normally hold the trip 125 with the catch 128 into engagement with the catch 129. When these catches are set so that the same engage one another, arm 118 is positioned out of engagement with the cam lugs 119 permitting the finger 110 to engage the dog 100 and hold the clutch mechanism released. It can readily be seen with this arrangement that when the finger 127 of the trip 125 is moved in a direction toward the left as viewed in Figure 1, that the catch 128 is disengaged from the catch 129 to release arm 118 which immediately moves to the position shown in Figure 1, whereupon the same becomes engaged by the cam lugs 119, throwing the finger 110 out of engagement with the dog 100, thereby causing the clutch mechanism to become operative to drive the shaft 54 and operate the cutter D.

To operate the trip 125 the following structure is employed: Along the side of the rail 14 is formed a T slot 133. To this rail is attached a depending plate 132 which is secured thereto by means of bolts 134 attached to the same in said T slot 133. To the lower portion of this plate are attached two lugs 135 between which is pivotally mounted a stop arm 136 which normally lies in the path of movement of the extreme end of the finger 127 of trip 125. A leaf spring 137 secured to the plate 132 normally holds the stop arm 136 in the plane of the said finger 127 when the parts are positioned as shown in Figure 5.

The carriage C in the normal inoperative position is arranged toward the sticker A, the guide F being relatively close to the guide E and the trip finger 127 depending vertically in advance of the stop arm 136. As the stock, which has been illustrated at 140, is fed from the sticker A through the guides E and F reaches the stop G, the end of the stock causes the entire carriage with the motor and cutter mounted thereon to travel away from said sticker A against the action of the spring 84. This movement continues until the section of the stock positioned upon the stop G and the cutter D is severed and removed from the body of the stock being fed through the machine. As soon as the finger 127 engages the stop arm 136 the trip 125 is operated as shown in Figure 1, the end of said finger 127 riding upon the upper surface of the stop arm 136 until the entire operation of cutting off the stock has been performed. As soon as the trip 125 is operated arm 118, which was normally held out of engagement with the cam lugs 119 by means of the catches 129 and 128, immediately returns to the position shown in Figure 1 through the action of spring 121. As soon as this arm arises in this position cam lugs 119 act upon arm 118, causing plate 108 to be swung away from the clutch mechanism, disengaging finger 110 from dog 100 which immediately actuates the clutch mechanism, causing the shaft 54 to rotate. The shaft 54 being arranged relative to the crank arm 57 so that the same is in its uppermost position, makes a complete revolution causing the cutting knife 33 to descend and cut off the section of the stock positioned between it and the stop G. At the same time, the shoe 81 forces the severed section of the stock downwardly between the leg 67 of angle 65 and the cutting member 38 where the same is discharged as previously described.

As soon as the cutting operation has been completed and the severed section of stock discharged from the device, the entire carriage immediately travels back again to normal position on account of the spring 84 and other means which will be presently described, and again assumes its original position. After the carriage resumes this position the finger 127 of trip 125 becomes disengaged from the stop arm 136 being positioned in advance of the same as previously described. After the parts have become so arranged the arm 118 is reset by a structure best illustrated in Figures 6 and 7. Upon the side of the arm 118, immediately back of the flanged member 97, the same is formed with a cam 141 which is adapted to be engaged by a cam lug 142 issuing outwardly from the periphery of said flanged member. After this cam lug strikes the inclined surface of the cam 141 arm 118 is oscillated upon its pivot 117 and forced away from the path of travel of the cam lugs 119. When the catch 129 passes the catch 128 the trip 125 is immediately drawn upwardly by means of spring 130 so that arm 118 becomes immediately reset and latched in this position. This action permits the spring 114 to force the plate 108 back again into normal position and allow the finger 110 of arm 109 to drop into the groove 111 which immediately engages the recess 112 of dog 100, withdrawing the said dog from engagement with one of the notches 99 of flanged member 98, thereby disengaging the clutch mechanism and halting the movement of the cutter D when the same reaches its uppermost position as shown in Figure 3. When the plate 108 is first swung away from the clutch mechanism by the release of the trip 125 and the movement of arm 118 in the path of travel of cam lugs 119 the trip finger 127, being pivoted to the same plate, normally swings outwardly with it and becomes disengaged from the stop lug 136 permitting the lever 126 to move upwardly due to the action of spring 130. This leaves the trip 125 again free to catch and hold the lever 118 when the same has been reset. Upon the resetting of this lever as before stated plate 108 assumes its normal position, which naturally brings the finger 127 back toward the stop arm 136. As before stated, this arm is pivoted to the lugs 135 so that the same may swing inwardly as the finger 127 engages it, permitting the finger 110 to function as previously described. The cam lug 142, after the arm 118 has been reset, takes a position below the lower point 143 of said cam member 141 so that the said arm 118 is again free to operate as far as the position of this cam is concerned.

In addition to the spring 84 the following structure is used for causing the carriage to be effectively returned to its starting position. Upon the face of the guide 59 is a slidably mounted vertically reciprocating plunger 150 which is slotted at 151 and has two screws 152 passing through the same which hold said plunger for sliding movement in a vertical direction. This plunger is adapted to be raised by means of a swinging arm 153 which is pivotally attached at 154 to a lug 155 formed on the upper surface of the extreme portion 61 of arm 30. This arm extends downwardly toward the lower end of the plunger 150 and is formed near its extreme lower end with a dog 156 adapted to engage into a notch 157 at the extreme lower end of the plunger 150. A tension coil spring 158 secured upon a pin 159 formed on the opposite end of arm 153 and to another pin 160 issuing outwardly from the lug 155 causes the arm 153 to be at all times forced against the plunger 150 so that dog 156 will normally engage the notch 157. It can readily be seen that as the cutter arm 30 is reciprocated by means of the crank arm 57 that the swinging arm 153 is caused to be raised and lowered and when the plunger 150 is in its normal position is caused to be raised along with the arm 153 through the engagement of the dog 156 thereon with the notch 157 in said plunger. The plunger 150 serves to apply tension to a spring which is indicated at 161 and which assists the spring 84 to return the carriage positively and quickly to its original position. This spring 161 is a tension coil spring and is secured at one end to a pin 162 which forms a shank of the bolt 107 used for securing the bar 106 to the carriage C. The other end of the spring 161 is secured to a cable 163 which passes below a pulley 164 pivoted by means of a bolt 165 to the web 17 of the base B. The cable 163 passes beneath the pulley 164 and upwardly where the same is attached at 166 to the lowermost portion of the plunger 150. When the plunger 150 is in its lowermost position the spring 161 is practically slack and exerts no appreciable tension upon the carriage E. When, however, the plunger 150 is raised by means of the arm 153 during the cutting operation of the stock, the tension is immediately applied to the spring 161 which, together with the tension in spring 84 causes the carriage to be practically instantaneously returned to its normal position. In Figures 1 and 3 the parts have been illustrated with the plunger 150 in its uppermost position and tension having been applied to spring 161 which is just ready to draw the carriage back again to its normal position.

In order to relieve the tension upon spring 161 when the carriage reaches its normal position the arm 153 is formed with a depending finger 167 which is adapted to engage a cam 168 formed on the lowermost portion of a plate 169 which is secured to the rail 14 by means of bolts 170 secured to the T slot 133. This plate 169 is so positioned that when the carriage arrives at its normal position said cam 168 engages the finger 167 swinging the arm 153 outwardly so as to disengage the dog 156 from the notch 157 of plunger 150. This immediately releases plunger 150, which through the action of spring 161 causes the same to be drawn to its lowermost position, thereby releasing the tension upon the said spring 161 and resetting the device so that the same moves freely forward as the end of the stock 140 again engages the stop mechanism G previously described. The spring 161 thereupon remains slack until the cutter arm 30 is again moved to cut off the stock, whereupon the arm 153 is caused to descend, the dog 156 again engaging in the notch 157 and raising the plunger 150 upwardly, thereby again applying tension to the spring 161, which causes the carriage C to be rapidly returned to normal position.

For absorbing the shocks imparted to the plunger 150 when the same is released by the cam 168 I form the plunger 150 with a head 171 secured thereto, which extends over the uppermost portion of the guide 59. A pin 172 passes through this head and is secured to the uppermost portion of the guide 59. Upon this pin is mounted a rubber bumper 173 which is adapted to be engaged by the head 171 as the plunger 150 is released. By this means the shock due to the rapid release of said plunger 150 is absorbed, thereby reducing the wear of the parts and the noise in the operation of the machine.

For reducing the shock and for terminating the movement of the carriage C I employ a dash pot 74 which may be of ordinary construction and which is attached to the rear end of cross member 15 of base B.

This dash pot has not been illustrated in detail but is of usual construction, being formed with a cylinder having a piston movable within the same of which the piston rod issuing outwardly therefrom is indicated at 175. Upon the extreme end of the plate 24 is positiond a rearwardly extending arm 176 which is secured thereto by means of bolts 177. This arm has a depending bracket 178 secured to the extreme end thereof to which is attached an adjusting screw 179 adapted to engage the protruding end of the piston rod 175 of dash pot 174. When the carriage is released and caused to return by spring 161 the screw 179 engages the piston rod 175 actuating the dash pot 174 which cushions the movement of the entire carriage and brings the same to rest with a minimum amount of shock or jar.

To prevent the carriage from rebounding after the same engages the dash pot 174 I employ a belt 180 which is directly attached to the carriage C. This belt passes over a pulley 181 pivotally mounted upon the end of the plate 19. The belt 180 extends downwardly over this pulley where the same has attached to it a counter weight 182 shown in dotted lines in Figure 1. This counter weight keeps the adjusting screw 179 in contact at all times with the piston rod 175 after the carriage has been released and first engages the same. In this manner the carriage is prevented from rebounding and the same comes quickly and effectively to a halt so that the carriage becomes immediately reset to again become operated upon by the engagement of the freshly severed end of the stock upon the stop member G.

The operation of the device may be briefly stated as follows: When the carriage is in its normal position the same is positioned as close to the sticker A as required, the plunger 150 being in its lowermost position and the spring 161 being released and slacked. In this position the piston rod 175 of dash pot 174 is being held in its innermost position against the action of the spring within said dash pot by contact with the adjusting screw 179 of carriage C, and is so held due to the action of spring 84 and counter weight 182. At the same time the cutting mechanism D is positioned as shown in Figure 3 with the shaft 54 arrested with the crank arm 57 in its uppermost position. With shaft 54 as illustrated the arm 109 is so positioned that the finger 110 is lodged within groove 111, the dog 100 being in engagement with the said finger 110 holding the said dog out of engagement with the notches 99 and permitting the flanged member 98 to rotate freely with the motor 86. While the parts are so arranged the arm 118 is held in its outermost position by means of the trip 125 which engages the catch 129 formed thereon. As the stock is fed through the two guides E and F and beneath the raised cutter 33 the same comes in contact with the portion 67 of stop G causing the entire carriage C, with the mechanism mounted thereon, to travel away from the sticker A upon the base B. As the carriage C travels the portion 127 of trip 125 engages the arm 136 which releases arm 118 permitting it to take the position shown in Figure 1. The cam member 119 now engages this arm forcing the plate 108 rearwardly so that the finger 110 is disengaged from the dog 100. This permits said dog to cooperate with the notches 99, which cause the shaft 54 to rotate together with the shaft 95. The rotation of shaft 54 causes the cutter 33 to cooperate with the shear member 38 and to sever the protruding portion of the stock positioned between said shear member and the stop 67. As this cutter descends downwardly the shoe 81 causes the severed portion of the stock to be discharged through the machine. The movement of the cutter arm 30 downwardly causes the arm 153 to also travel downwardly which, when it reaches its lowermost position, engages the plunger 150 carrying the same upwardly. The rotation of shaft 54 continues until the cam 142 engages the cam surface 141 which automatically resets the arm 118. As soon as the plate 108 is moved trip 125 passes outwardly beyond the stop arm 136 being then in position to catch and hold the arm 118. As soon as this arm is moved out of engagement with the cams 119 the finger 110 drops back into groove 111 and engages the dog 100 to disengage the clutch mechanism of the invention. The flanged member 98 then again continues to freely rotate as before. As soon as the severed piece of stock has been discharged and the plunger 150 raised, tension is applied to the spring 161 which causes the carriage to quickly return to its normal position. As soon as arm 153 engages cam 168 the tension on spring 161 is immediately released and the carriage comes to a dead stop, which as before brought out is brought about through the action of the weight 182 and the dash pot 174.

The advantages of my invention are manifest. The machine is absolutely automatic in the cutting off of the sections of stock at the desired length. By adjusting the stop any length of sections can be cut off within the range of the device. Since the entire cutoff mechanism is movable as a unit, it is practically impossible for the same to become inoperable, since the transmission of the force necessary to effect the severance of the stock does not take place through any fixed portion of the machine. At the same time, the stock may be accurately cut off at the desired length. The device operates within a large range of speeds so that the same may be used with different machines if desired. In the actuation of the cutoff mechanism the direct engagement of the stock with the stop causes the same to be operated. With my invention, however, the stock in engaging the stop merely serves to release the trip mechanism which functions to set in operation the cutoff mechanism to effect the severance of the stock as desired. By means of the auxiliary spring and the tensioning device associated therewith the carriage supporting the cutoff mechanism is quickly and effectively returned to rest in its normal position. The device may also be used for trimming sections of stock as well as cutting off the same.

While I have illustrated my cutting off mechanism associated with a sticker wherein material is run through practically continuously, one piece after another, obviously my cutting device can be equally well adapted to other devices where a cutoff means of a similar nature is required.

An important feature of the invention resides in the means of operation of my device by the material coming through the sticker or other machine so that equal lengths of material are cut off automatically and in synchronism with the operation of the sticker or other machine to which my cutting device it attached. The motor on my cutting device operates continuously and while it has not been illustrated in the drawings obviously it can operate a saw or other cutting mechanism which is equivalent in function to the cutting knife illustrated in the drawings.

The automatic operation of my device is quite important in that the device is mounted upon a carriage and is automatically positioned to engage with the edge of the stock coming through the machine in which my device is attached. Then the retarding means is very essential to prevent any chattering which might interfere with the operation of the device to which my machine is attached when the cutting mechanism is released automatically into position to engage the edge of the material coming out of the machine after a portion of the same has been cut off and discharged out of the path of movement of the material coming through the sticker or other machine.

In accordance with the patent statutes I have described the principles of operation of my invention together with the apparatus which I consider to represent the best embodiment thereof, and while I have illustrated my automatic cutter of a particular construction in the drawings, I desire to have it understood that this is only illustrative and that the invention can be carried out by other means and applied to uses other than those above set forth within the scope of the following claims.

I claim:

1. A cutoff machine comprising a carriage, a cutoff mechanism mounted thereon, said carriage being adapted to be advanced by the engagement of the stock passing through the machine therewith, means for operating said cutoff mechanism to sever sections of stock from the body thereof and means for discharging said severed sections of stock through said carriage to permit the same to return to normal position.

2. A cutoff machine comprising a movable carriage, a cutoff mechanism mounted thereon, means adapted to be engaged by the stock passing through said machine for advancing the carriage in the direction of travel of the stock, resilient means for returning the carriage to normal position, means for actuating said cutoff mechanism to sever a section of stock and to permit said carriage to be returned to normal position by said resilient means and means for holding said carriage from rebounding upon arriving at its normal position.

3. A cutoff machine comprising a movable carriage, a cutoff mechanism mounted thereon, means adapted to be engaged by the stock passing through said machine for advancing the carriage in the direction of travel of the stock, resilient means for returning the carriage to normal position, means for actuating said cutoff mechanism to sever a section of stock and to permit said carriage to be returned to normal position by said resilient means and a weighted member for holding said carriage from rebounding when the same reaches its normal position.

4. A cutoff machine comprising a movable carriage, a cutoff mechanism mounted thereon, means adapted to be engaged by the stock passing through said machine for advancing the carriage in the direction of the traveling of the stock, resilient means for returning the carriage to normal position, means for accelerating the return of said carriage to normal position and means for rendering said accelerating means inoperable upon the travel of said carriage in the direction of travel of said stock.

5. A cutting device associated with a continuously operating machine adapted to feed stock of finished material therefrom, said cutting device being moved by the material to move said cutting device in synchronism with the movement of said material, means for cutting the material, means for holding the cutting means normally out of operation, means for operating the cutting means, means for automatically connecting said cutter, operating means with said cutter means and means for automatically returning said cutting device into position to engage the material at the edge where it has just been severed, whereby the cutting off operation may be repeated to cut off the material in predetermined lengths continuously as it is passed out of the machine to which said cutting device is connected.

6. An automatic cutter including a movable carriage, means for supporting said carriage, a motor mounted upon said carriage, a cutting member, means for intermittently connecting said motor and cutter means for retarding the movement of said carriage to hold it against the material coming out of a machine to which said cutting device is attached to cause the material to move said carriage, means for automatically releasing the connecting means between said motor and cutter to cut the material moving said carriage in predetermined lengths, means for returning the carriage into position to be again moved by the material to be cut off and means for retarding the backward movement of said carriage to prevent chattering and rebounding of said carriage so that the material will be engaged without jar to permit it to move the carriage freely into cutting position.

7. A cutting device including a carriage adapted to support an electric motor which is adapted to be operated continuously, a cutter mounted upon said carriage, means connecting said cutter with said motor, means for holding said connecting means normally out of operating position, means adapted to automatically cause said connecting means to operate said cutter to cut the material being continuously fed from a machine and means adapted to reposition said cutting device so that the carriage of the same will be moved by the material to be cut off into a new position to continuously cut portions off of the continuously moving material.

8. An automatic cutter including a slidable carriage, means for supporting said carriage, a motor, a cutter means for intermittently connecting said cutter with said motor, said carriage with the motor and cutter being adapted to be moved into cutting position by the material which the cutter is adapted to sever and means for repositioning the carriage without jar against the continuously moving material, being cut off intermittently by the cutter to automatically operate the cutter by the continuous operation of the material which moves the carriage.

LYTTON J. SHIELDS.